(12) United States Patent
Wright et al.

(10) Patent No.: US 9,624,044 B2
(45) Date of Patent: Apr. 18, 2017

(54) SHIPPING/STORAGE RACK FOR BUCKETS

(71) Applicant: CWS Industries (Mfg) Corp., Surrey (CA)

(72) Inventors: Steve Wright, Surrey (CA); Bob Beales, Surrey (CA)

(*) Notice: Subject to any disclaimer, the term of this patent is extended or adjusted under 35 U.S.C. 154(b) by 0 days.

(21) Appl. No.: 14/832,489

(22) Filed: Aug. 21, 2015

(65) Prior Publication Data
US 2017/0008710 A1    Jan. 12, 2017

(51) Int. Cl.
B65G 57/00 (2006.01)
B65G 57/16 (2006.01)
B65G 57/03 (2006.01)
B65D 19/44 (2006.01)

(52) U.S. Cl.
CPC ........... *B65G 57/165* (2013.01); *B65D 19/44* (2013.01); *B65G 57/03* (2013.01); *B65D 2519/0082* (2013.01)

(58) Field of Classification Search
CPC ...... B65G 57/03; B65G 57/165; B65D 19/44; B65D 2519/0082
USPC ............ 414/788.2, 802; 211/27, 41.14, 49.1, 211/85.17, 85.7, 204, 206
See application file for complete search history.

(56) References Cited

U.S. PATENT DOCUMENTS

| 2,743,021 | A | * | 4/1956 | Glenn | A47F 5/112 211/49.1 |
| 3,701,443 | A | | 10/1972 | Van Der Lely | |
| 4,790,084 | A | * | 12/1988 | Anderson et al. | E02F 3/968 37/403 |
| 4,995,760 | A | | 2/1991 | Probst | |
| 5,464,104 | A | | 11/1995 | McArthur | |
| 6,374,520 | B1 | * | 4/2002 | Westendorf et al. | E02F 3/40 37/444 |
| 6,832,562 | B2 | | 12/2004 | Tabor et al. | |
| 2008/0041740 | A1 | | 2/2008 | Hyp | |
| 2013/0327736 | A1 | | 12/2013 | Del Olmo | |
| 2014/0360552 | A1 | * | 12/2014 | Britcher et al. | H02S 20/00 136/244 |

FOREIGN PATENT DOCUMENTS

CN    202880081 U    4/2013

OTHER PUBLICATIONS http://www.australianbucketsupplies.com.au/manufacturing.html.

* cited by examiner

Primary Examiner — Patrick Maestri

(57) ABSTRACT

A rack for a heavy equipment bucket having a rectangular base and two vertical posts. Each vertical post has one or more upwardly angled extending protrusions. A series of double ended reverse hooks are provided with the rack for stacking heavy equipment buckets.

4 Claims, 9 Drawing Sheets

SHIPPING/STORAGE RACK FOR BUCKETS

FIELD OF THE INVENTION

This invention relates to shipping and storage racks. In particular, this invention relates to shipping and storage racks for heavy equipment buckets.

BACKGROUND OF THE INVENTION

Various types of heavy equipment buckets for handling matters are known in the art. Such buckets typically have a floor, a back wall, and two side plates and are made of metal. Depending on the size, some buckets may weigh hundreds of kilograms. The size and weight of such buckets makes storage and shipping difficult in many cases.

Various rack systems for staking portable containers are known in the art. For example, U.S. Pat. No. 5,464,104 and U.S. Patent Application Pub. No. 2013/0327736 disclose rack systems for recycling containers and flower containers respectively. However, given the size and weight of heavy equipment buckets such as skid steer buckets and loader buckets, it is unlikely that a person skilled in the art would consider such rack systems.

It is therefore an object of this invention to provide an effective racking system for heavy equipment buckets. It is a further object of the invention to provide such a system that is specifically tailored to buckets that are designed to be nested inside one another.

These and other objects of the invention will be better understood by reference to the detailed description of the preferred embodiment which follows. Note that the objects referred to above are statements of what motivated the invention rather than promises. Not all of the objects are necessarily met by all embodiments of the invention described below or by the invention defined by each of the claims.

SUMMARY OF THE INVENTION

The Invention provides a racking system for stacking skid steer or loader buckets.

One aspect, the invention comprises a rack for buckets having a rectangular base, and abutment stub and two vertical posts. The rectangular base has two side base members connected by a front and a rear base members. The side, front and rear bases members lie in a plane and the base has two rear corners and two front corners. The abutment stub extends upward from each of the front corners and terminates above the plane. One vertical post extends upward from one rear corner and the other vertical post extends upwards from the other rear corner. A first upwardly angled extending protrusion is connected to one vertical post at a height above the plane and a second upwardly extending protrusion is connected to the other vertical post at the same height as the first upwardly angled extending protrusion.

In a further aspect, the rack has a plurality of pairs of upwardly angled protrusions at spaced intervals along the vertical posts.

In yet a further aspect, the invention is a racking system for skid steer and loaders comprising a rack and a plurality of double ended reverse hooks for spacing buckets stacked on the rack.

In another aspect, the invention is a method of stacking skid steer or loader buckets on a rack. According to the method, a rack with a plurality of pairs of upwardly angled protrusions at spaced intervals along two vertical posts is provided and a first bucket is installed on the rack. The first bucket is installed on the rack such that an opening of the first bucket faces downward and a floor of the first bucket faces away from the vertical posts of the rack. The forward edges of the first bucket rest on the base side members and a portion of the first bucket abuts the abutment stubs. A top edge of the first bucket rests on the first and second angled protrusions. A second bucket is installed on the rack so as to nest with the first bucket and such that the opening of the second bucket faces downward, a floor of the second bucket faces away from the vertical posts, and a top edge of the second bucket rests on one of the pairs of protrusions other than the first or second angled protrusions.

After installing the first bucket, one end of a double ended reverse hook may be hooked on an edge of the first bucket such that an opposed end of the hook opens upward. The installation of the second bucket further comprises resting an edge of the second bucket on the opposed upwardly open edge of the hook.

In yet a further aspect, the invention is a method of stacking buckets on a rack. According to the method, a rack is provided and a first bucket is installed on the rack. The first bucket is installed on the rack such that an opening of the first bucket faces downward and a floor of the first bucket faces away from the vertical posts of the rack. The forward edges of the first bucket rest on the base side members and a portion of the first bucket abuts the abutment stubs. A top edge of the first bucket rests on the first and second angled protrusions. A second bucket is installed on the rack so as to nest with the first bucket and such that the opening of the second bucket faces downward, a floor of the second bucket faces away from the vertical posts.

In a further aspect, before installing the second bucket one end of a double ended reverse hook on an edge of the first bucket is hooked such that an opposed end of the hook opens upward and the step of installing the second bucket further comprises resting an edge of the second bucket on the opposed upwardly open end of the hook.

The foregoing may cover only some of the aspects of the invention. Other aspects of the invention may be appreciated by reference to the following description of at least one preferred mode for carrying out the invention in terms of one or more examples. The following mode(s) for carrying out the invention is not a definition of the invention itself, but is only an example that embodies the inventive features of the invention.

BRIEF DESCRIPTION OF THE DRAWINGS

At least one mode for carrying out the invention in terms of one or more examples will be described by reference to the drawings thereof in which.

DETAILED DESCRIPTION OF AT LEAST ONE MODE FOR CARRYING OUT THE INVENTION IN TERMS OF EXAMPLE(S)

Figure 1:
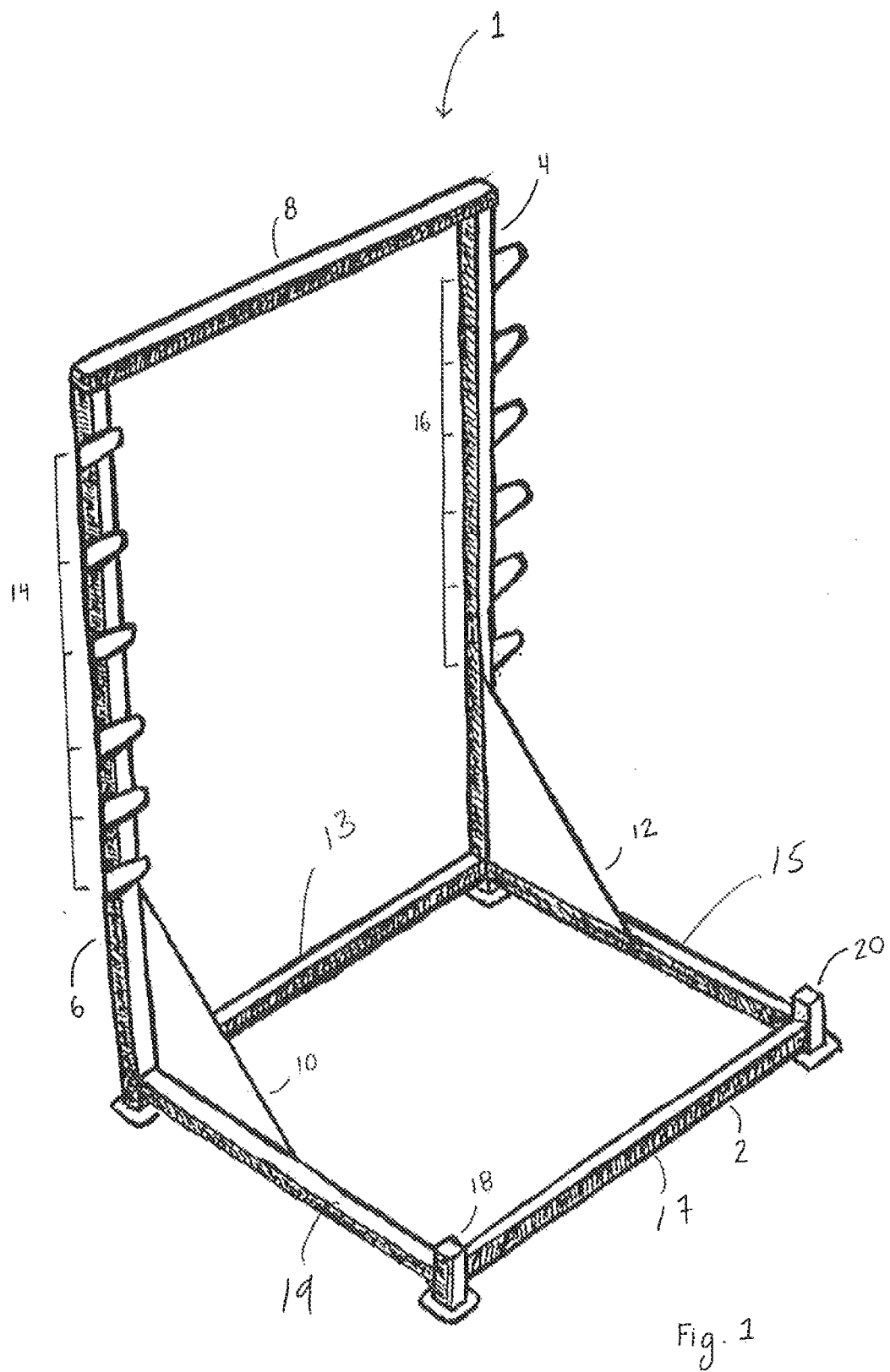
FIG. 1 is a front perspective view of a first embodiment of the shipping/storage rack.

FIG. 1 shows a first embodiment of the shipping/storage rack. The rack 1 has a rectangular base 2 with two posts 4, 6 extending upwards from the two rear corners of the base 2. A horizontal post 8 connects the tops of the two rear vertical posts. Triangular braces 10, 12 are connected to the bottom of each post and the frame. The two vertical rear posts each contain a series of upwardly extending protrusions 14, 16 that act as supports as described below.

Figure 2:
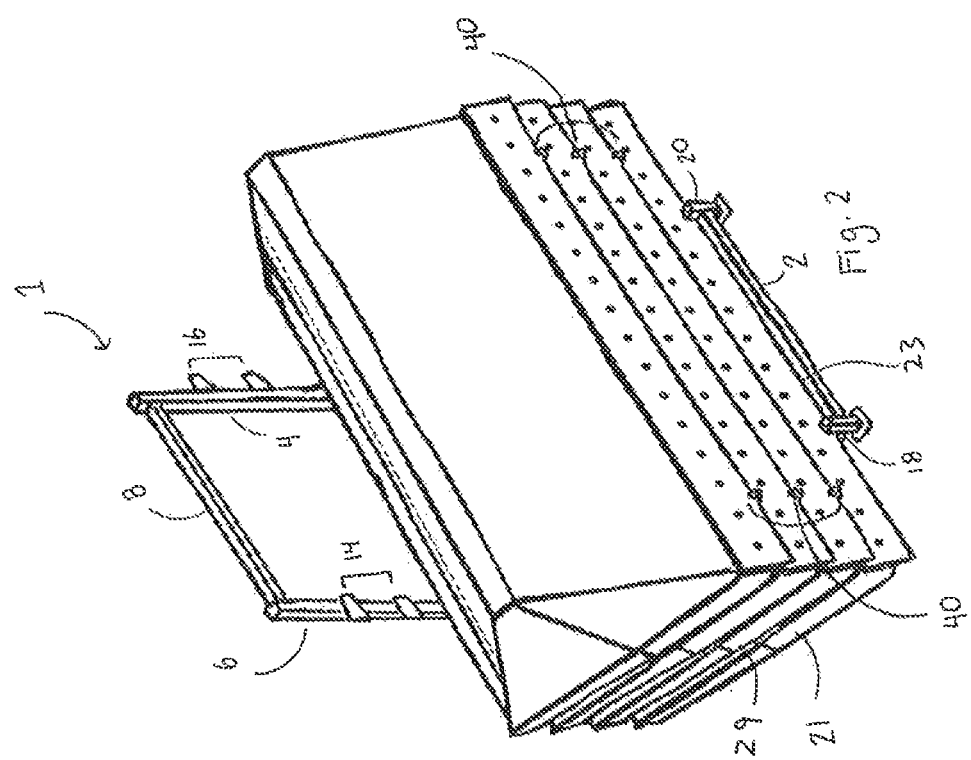
FIG. 2 is a front perspective view of the first embodiment illustrated in FIG. 1, shown with four stacked buckets.
Figure 3:
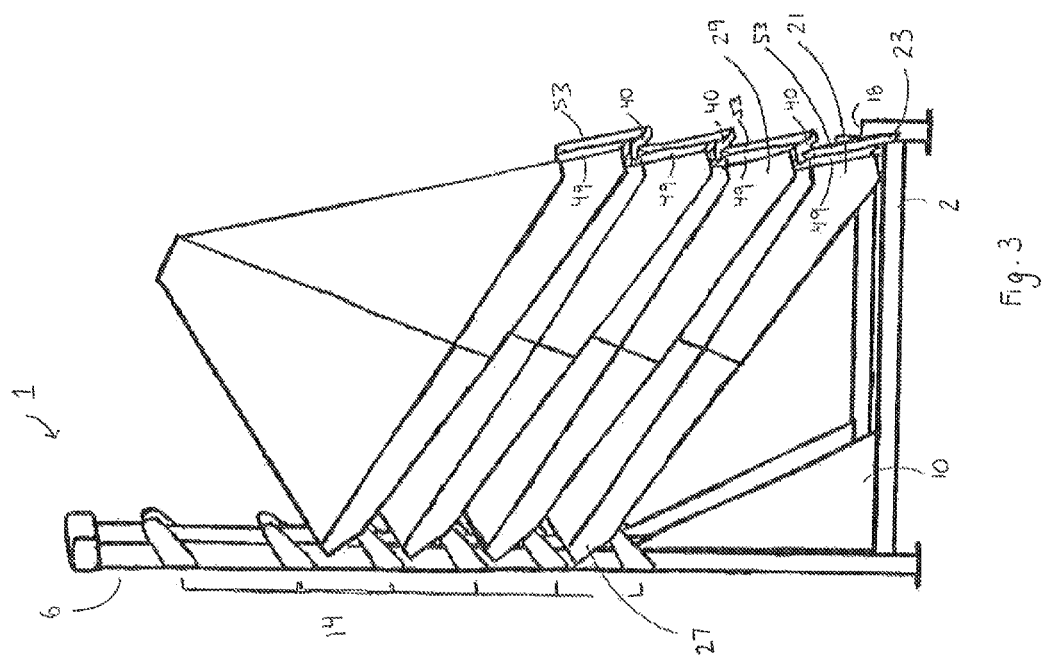
FIG. 3 is a side elevation view of the first embodiment illustrated in FIG. 1, shown with four stacked buckets.

Each front corner of the base 2 has short, upwardly extending abutment stubs 18, 20 extending above the height of the base frame members 13, 15, 17, 19. Referring now to FIGS. 2 and 3 according to the system of the invention, buckets are installed on the rack with their openings facing downward and the floors of the buckets facing away from the vertical posts 4, 6. An edge 23 of the lowermost bucket is placed on the rack and abuts the inside edge of the abutment stubs 18, 20 at the front of the rack. The abutment stubs 18, 20 therefore assist in retaining the buckets on the rack.

To stack buckets on the rack 1, a first bucket 21 is placed on the rack such that a bottom edge 23 rests on the rectangular base members 15, 19 near the front of the rack and against the abutment stubs 18, 20. The top edge of the bucket 27 (typically corresponding to a leading edge of the back wall) rests along the upper surface of the lowest available protrusions 14, 16 on each vertical post 4, 6. The angles of the protrusions 14, 16 are preferably selected to match the angle of the surface of the bucket back wall when the bucket is installed on the rack. At least two double ended reverse hooks 40 are then placed on the first bucket on the outside face of the floor piece for supporting the next bucket.

The next bucket 29 placed on top of the first bucket 21 rests on a combination of the two or more hooks 40 mounted on the underlying bucket and on the next available protrusions 14, 16 on each vertical post 4, 6. Additional buckets are stacked on top, one after another in the same manner using additional hooks 40 between sequentially stacked buckets.

Figure 4:
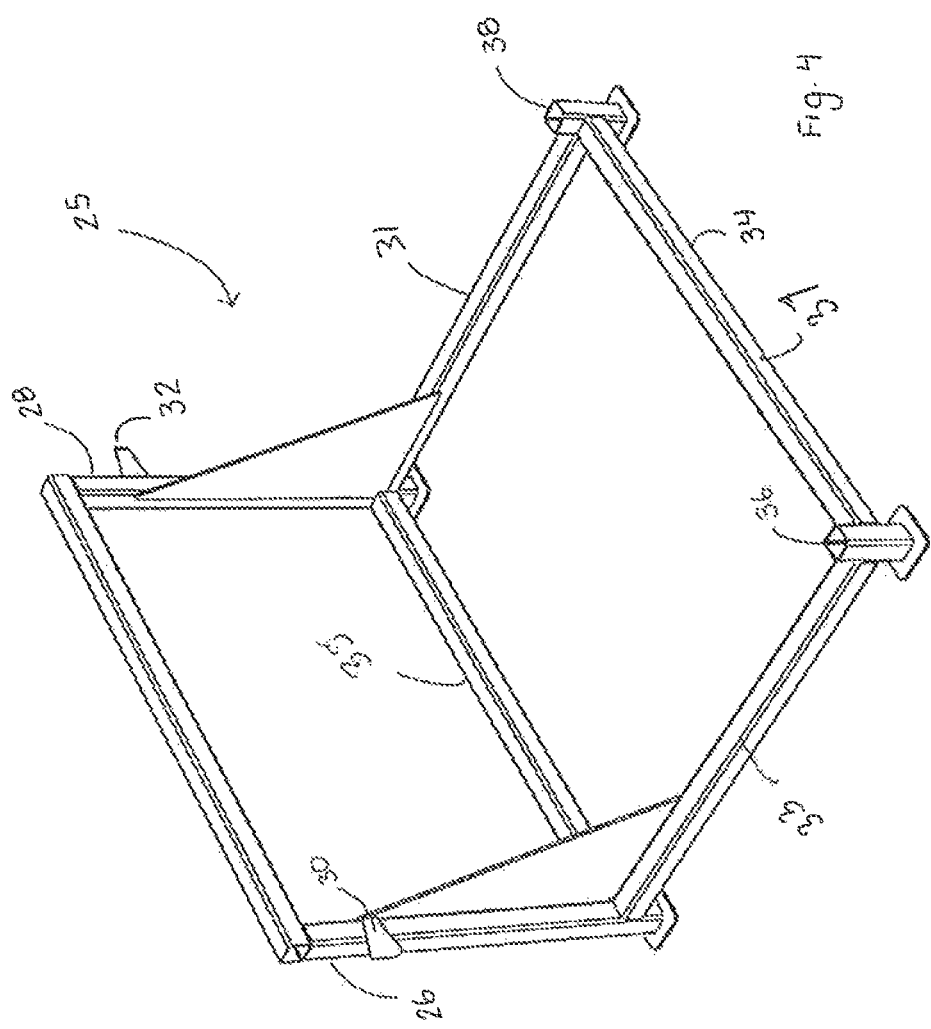
FIG. 4 is a front perspective view of a second embodiment of the shipping/storage rack.

FIG. 4 shows a second embodiment of the shipping/storage rack. In the second embodiment, each of the two vertical posts 26, 28 of the rack 25 contains a single angled protrusion 30 or 32, rather than a series of spaced protrusions.

Figure 5:
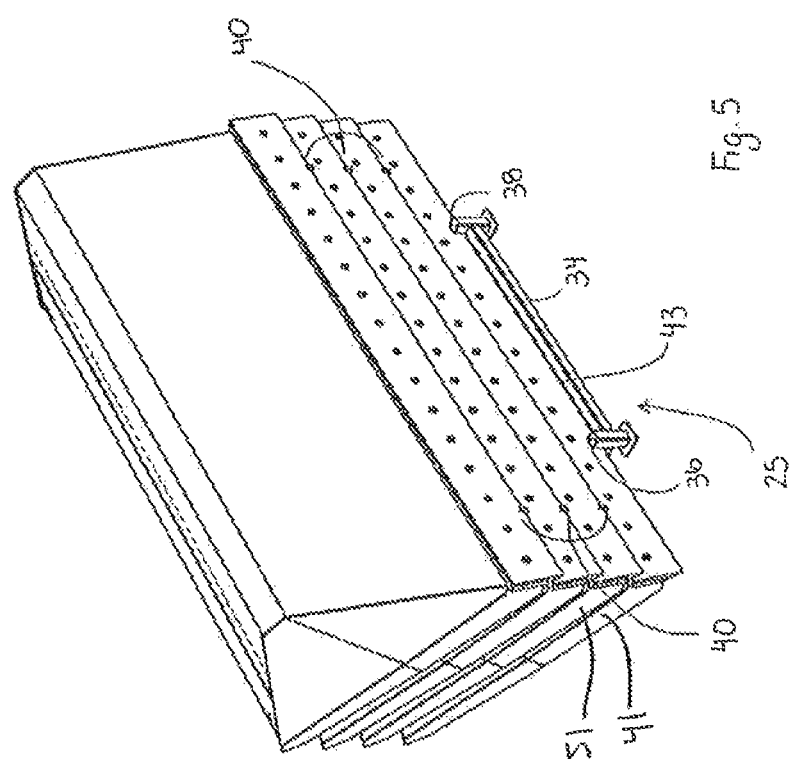
FIG. 5 is a front perspective view of the second embodiment illustrated in FIG. 4, shown with four stacked buckets.
Figure 6:
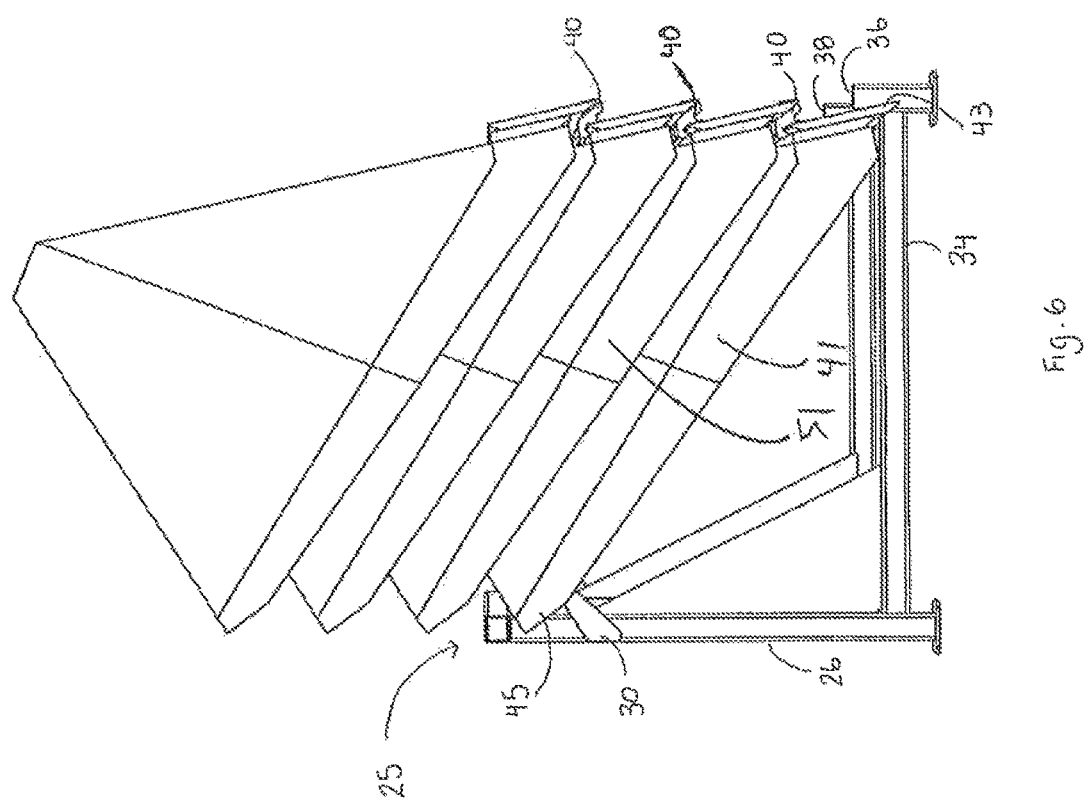
FIG. 6 is a side elevation view of the second embodiment illustrated in FIG. 4, shown with four stacked buckets.

Referring to FIGS. 5 and 6, to stack buckets on rack 25, the first bucket 41 is placed on the rack 25 such that the bottom edge 43 rests on the rectangular base members 31, 33 near the front of the rack and against the abutment stubs 36, 38. The top edge 45 of the bucket is rested against the angled protrusions 30, 32 on the two vertical posts. Again, the angle of the protrusions 30, 32 is preferably selected to match the angle of the bucket back wall when the bucket is installed on the rack.

Figure 9:
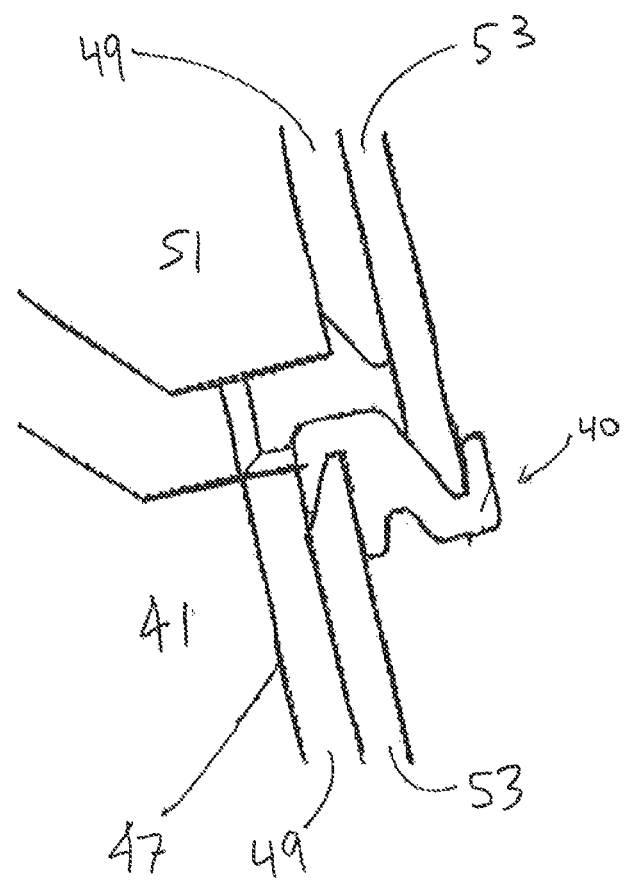
FIG. 9 is a side view of the double ended reverse hook between the lowermost two buckets shown in FIGS. 5 and 6.

As best shown in FIG. 9, hooks 40 are then placed on the first bucket 41 outside face of the floor piece 47 and by taking advantage of a slot that exists between the bolt-on edge 53 and lip plate 49 of the bucket. The next bucket 51 is placed on top of the first bucket 41 such that its gussets rests on the side edges of the bucket directly below it and its bolt-on edge 53 rests on the hooks 40 placed on the first bucket 41 directly below it.

The vertical stacking of the buckets on both embodiments reduces the area required for storage, makes it convenient to place buckets in a shipping container, while the use of the optional hooks 40 reduces the scratching and scuffing of the buckets during racking and transportation. The rack and hooks 40 also reduce the possibility of sequentially stacked buckets becoming stuck or jammed together by creating a space between the stacked buckets.

Figure 7:
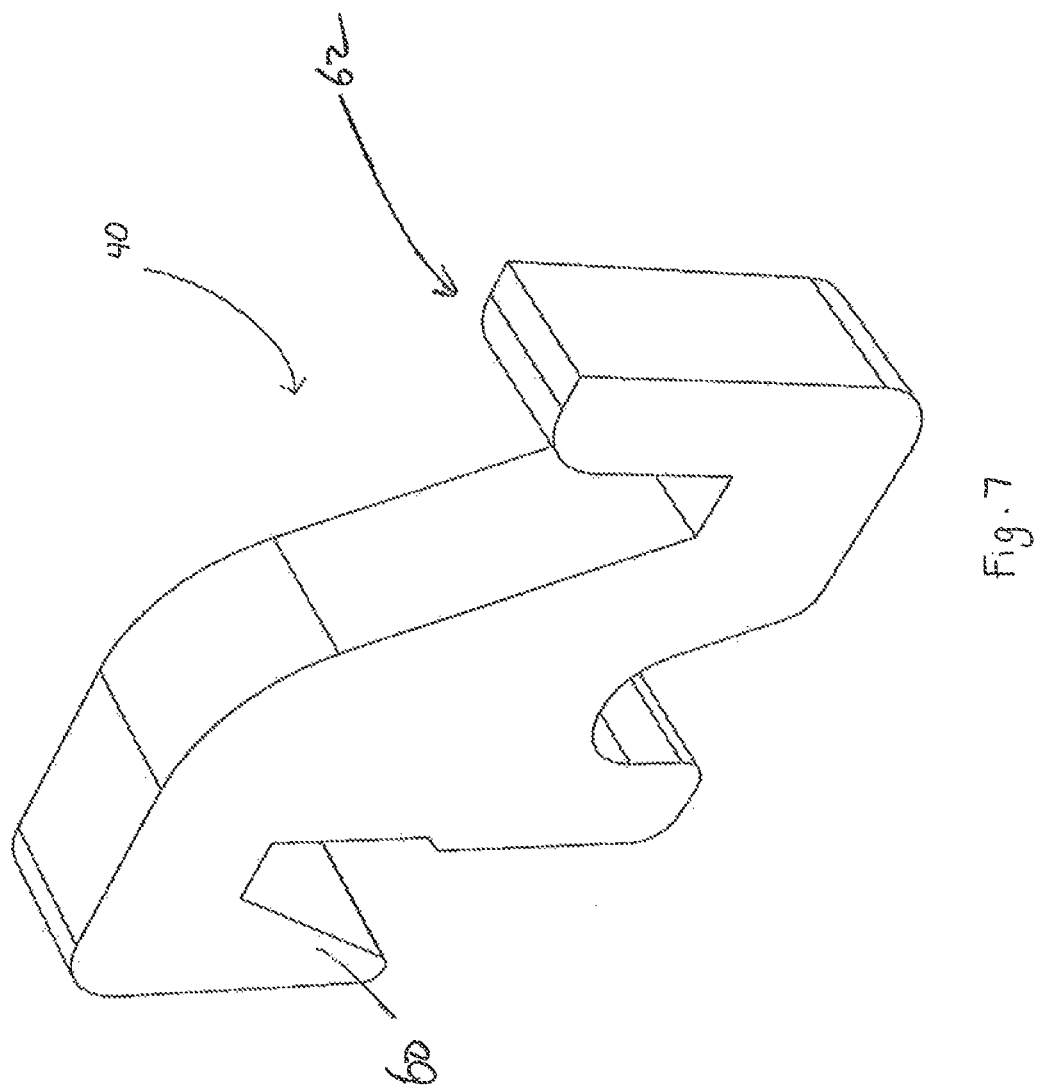
FIG. 7 is a perspective view of a double ended reverse hook.
Figure 8:
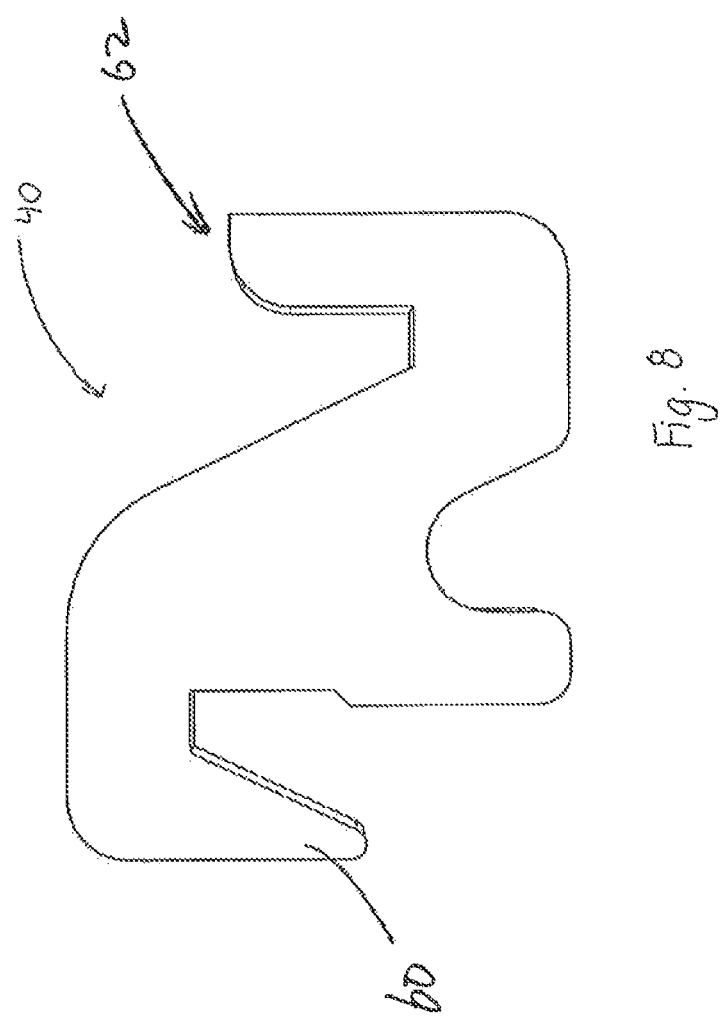
FIG. 8 is a side view of the double ended reverse hook shown in FIG. 7.

As illustrated in FIGS. 7 and 8, the preferred embodiment of hooks 40 is a double ended reverse hooks. The use of a double ended reverse hook 40 allows the installation of the hook 60 on the bolt-on edge 53 of an installed bucket while presenting the opposite end of the hook 62 facing upward for supporting the bolt-on edge 53 of the next bucket above.

It will be appreciated that the rack and hook system can be used to stack any buckets having one or more gaps for receiving the hook 60 of the double ended reverse hook 40. The gap may extend along the length of the bucket floor or may be located at one or more portions along the length of the bucket floor.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A heavy equipment bucket racking system comprising:
   a rack for skid steer and loader buckets comprising:
      a rectangular base comprising two side base members connected by a front and a rear base members said side, front and rear base members lying in a plane, said base having first and second rear corners and first and second front corners;
      an abutment stub extending upward from each of said front corners and terminating above said plane;
      a first vertical post extending upwards from said first rear corner and a second vertical post extending upwards from said second rear corner;
      a first upwardly angled extending protrusion connected to the first vertical post at a first height above said plane;
      a second upwardly angled extending protrusion connected to the second vertical post at said first height; and,
      a plurality of double ended reverse hooks for spacing buckets stacked on said rack.

2. A method of stacking skid steer or loader buckets on a rack comprising:
   providing a rack for skid steer and loader buckets, said rack comprising:
      a rectangular base comprising two side base members connected by a front and a rear base members said side, front and rear base members lying in a plane, said base having first and second rear corners and first and second front corners;
      an abutment stub extending upward from each of said front corners and terminating above said plane;
      a first vertical post extending upwards from said first rear corner and a second vertical post extending upwards from said second rear corner;

a first upwardly angled extending protrusion connected to the first vertical post at a first height above said plane;
a second upwardly angled extending protrusion connected to the second vertical post at said first height;
a plurality of pairs of upwardly angled protrusions at spaced intervals along said vertical posts;
installing a first bucket on said rack such that:
an opening of said first bucket faces downward and a floor of said first bucket faces away from said vertical posts;
forward edges of said first bucket rest on said base side members and a portion of said first bucket abuts said abutment stubs;
a top edge of said first bucket rests on said first and second angled protrusions;
hooking one end of a double ended reverse hook on an edge of said first bucket such that an opposed end of said hook opens upward;
installing a second bucket on said rack so as to nest with said first bucket and such that an opening of said second bucket faces downward, a floor of said second bucket faces away from said vertical posts, and a top edge of said second bucket rests on one of said pairs of protrusions other than said first or second angled protrusions; and
said step of installing said second bucket further comprises resting an edge of said second bucket on said opposed upwardly open end of said hook.

3. A method of stacking heavy equipment buckets on a rack comprising:
providing a rack for skid steer and loader buckets comprising:
a rectangular base comprising two side base members connected by a front and a rear base members said side, front and rear base members lying in a plane, said base having first and second rear corners and first and second front corners;
an abutment stub extending upward from each of said front corners and terminating above said plane;
a first vertical post extending upwards from said first rear corner and a second vertical post extending upwards from said second rear corner;
a first upwardly angled extending protrusion connected to the first vertical post at a first height above said plane; and
a second upwardly angled extending protrusion connected to the second vertical post at said first height;
installing a first bucket on said rack such that:
an opening of said first bucket faces downward and a floor of said first bucket faces away from said vertical posts;
forward edges of said first bucket rest on said base side members and a portion of said first bucket abuts said abutment stubs;
a top edge of said first bucket rests on said first and second angled protrusions;
hooking one end of a double ended reverse hook on an edge of said first bucket such that an opposed end of said hook opens upward;
installing a second bucket on said rack to nest with said first bucket and such that an opening of said second bucket faces downward, a floor of said second bucket faces away from said vertical posts; and
said step of installing said second bucket further comprises resting an edge of said second bucket on said opposed upwardly open end of said hook.

4. The heavy equipment bucket racking system of claim 3 wherein said rack further comprises a plurality of pairs of upwardly angled protrusions at spaced intervals along said vertical posts.

* * * * *

UNITED STATES PATENT AND TRADEMARK OFFICE
CERTIFICATE OF CORRECTION

PATENT NO. : 9,624,044 B2  
APPLICATION NO. : 14/832489  
DATED : April 18, 2017  
INVENTOR(S) : Steve Wright et al.

Page 1 of 1

It is certified that error appears in the above-identified patent and that said Letters Patent is hereby corrected as shown below:

In the Claims

Column 6, Lines 32-33, the portion of Claim 4 reading "claim 3" should read --claim 1--

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*